United States Patent
Reeb et al.

(10) Patent No.: US 7,002,448 B2
(45) Date of Patent: Feb. 21, 2006

(54) CONTROL DRIVE WITH ADJUSTABLE POTENTIONMETER

(75) Inventors: Wolfgang Reeb, Ottersweier-Hatzenweier (DE); Bernd Diebold, Sant Cugat (ES); Hans-Peter Schemel, Sitges (ES)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 10/088,144

(22) PCT Filed: Jun. 29, 2001

(86) PCT No.: PCT/DE01/02359

§ 371 (c)(1),
(2), (4) Date: Jun. 11, 2002

(87) PCT Pub. No.: WO02/03529

PCT Pub. Date: Jan. 10, 2002

(65) Prior Publication Data

US 2003/0000326 A1 Jan. 2, 2003

(30) Foreign Application Priority Data

Jul. 1, 2000 (DE) .......................... 100 32 187

(51) Int. Cl.
*H01C 10/00* (2006.01)

(52) U.S. Cl. ................. 338/199; 184/DIG. 1; 184/116

(58) Field of Classification Search ............... 338/116, 338/DIG. 1, 184, 199
See application file for complete search history.

(56) References Cited

U.S. PATENT DOCUMENTS

| | | | | |
|---|---|---|---|---|
| 355,729 A | * | 1/1887 | Stevens | ........................ 338/45 |
| 2,341,182 A | * | 2/1944 | Jones | ........................ 338/116 |
| 2,664,754 A | * | 1/1954 | Brown | ..................... 235/61 R |
| 2,730,596 A | * | 1/1956 | McLaughlin | ................ 338/116 |
| 2,846,641 A | * | 8/1958 | Basham | ...................... 318/663 |
| 2,863,281 A | * | 12/1958 | Haydon et al. | ............... 60/698 |
| 3,883,839 A | * | 5/1975 | Barrett et al. | ............... 338/116 |
| 4,311,946 A | * | 1/1982 | Pathmann | ................... 318/663 |
| 4,931,710 A | | 6/1990 | DeVara et al. | |
| 4,950,965 A | | 8/1990 | Kenny | |
| 5,580,278 A | | 12/1996 | Fowler et al. | |
| 5,794,766 A | | 8/1998 | Morita | |
| 5,990,586 A | | 11/1999 | Milano | |

FOREIGN PATENT DOCUMENTS

| | | | |
|---|---|---|---|
| EP | 0 336 207 A2 | 10/1989 | |
| EP | 0 681 359 A1 | 11/1995 | |
| JP | 3-201505 | * 9/1991 | ................ 338/116 |
| JP | 3-222401 | * 10/1991 | ................ 338/116 |
| JP | 6-104103 | * 4/1994 | ................ 338/116 |

OTHER PUBLICATIONS

Patent Abstracts of Japan vol. 008, No. 094 (M–293) Apr. 28, 1984 & JP 59 008544 A, Jan. 17, 1984.

* cited by examiner

*Primary Examiner*—Karl D. Easthom
(74) *Attorney, Agent, or Firm*—Michael J. Striker

(57) ABSTRACT

A control drive according to the related art does not have a potentiometer that allows a position of the motor or the driven wheel to be registered.

The control drive (1) according to the invention allows a position of the motor or the driven wheel to be registered using a potentiometer (25) and a defined home position to be adjusted.

11 Claims, 3 Drawing Sheets

CONTROL DRIVE WITH ADJUSTABLE POTENTIONMETER

BACKGROUND OF THE INVENTION

The invention relates generally to a control drive.

A control drive is made known in EP 681 359 A1 that has an electric circuit. This control drive does not have a potentiometer, however, that makes it possible to achieve a very exact alignment between any position of a driven wheel and a position of the potentiometer resulting therefrom by means of the potentiometer housing, so that the potentiometer is located in a home position.

A potentiometer is made known in U.S. Pat. No. 5,794,766. The potentiometer cannot be rotated relative to a base plate, however, in order to carry out the alignment described above.

U.S. Pat. No. 5,580,278 discloses a detent toothing that cannot be rotated, however.

SUMMARY OF THE INVENTION

In contrast, the control drive according to the invention has the advantage that a home position of the potentiometer is adjustable in simple fashion at a specified position of the driven wheel.

It is advantageous when the housing of the control drive forms a detent toothing with the housing of the potentiometer, because this secures the potentiometer against rotation when installed.

An advantageous embodiment of the invention is given by means of a longitudinal hole in the potentiometer housing, because the detent toothing is then realized in an elastic design and rotation of the housing during alignment is simplified.

It is further advantageous that electrical connections of the potentiometer form a serpentine contour, because this allows length to be offset as necessary when the potentiometer housing is rotated.

It is particularly advantageous when all parts to be installed in the housing of the control drive are installable in one installation direction, because this simplifies and shortens the assembly process.

An advantageous installation of the control drive is made possible by the fact that an electric motor and/or the transvers worm can be installed in the housing of the control drive.

It is further advantageous that the axial play of a rotor shaft of the electric motor is damped via a leaf spring.

BRIEF DESCRIPTION OF THE DRAWINGS

An exemplary embodiment of the invention is shown in simplified form in the drawing and described in greater detail in the following description.

DETAILED DESCRIPTION OF THE PREFERRED EMBODIMENT

Figure 1:
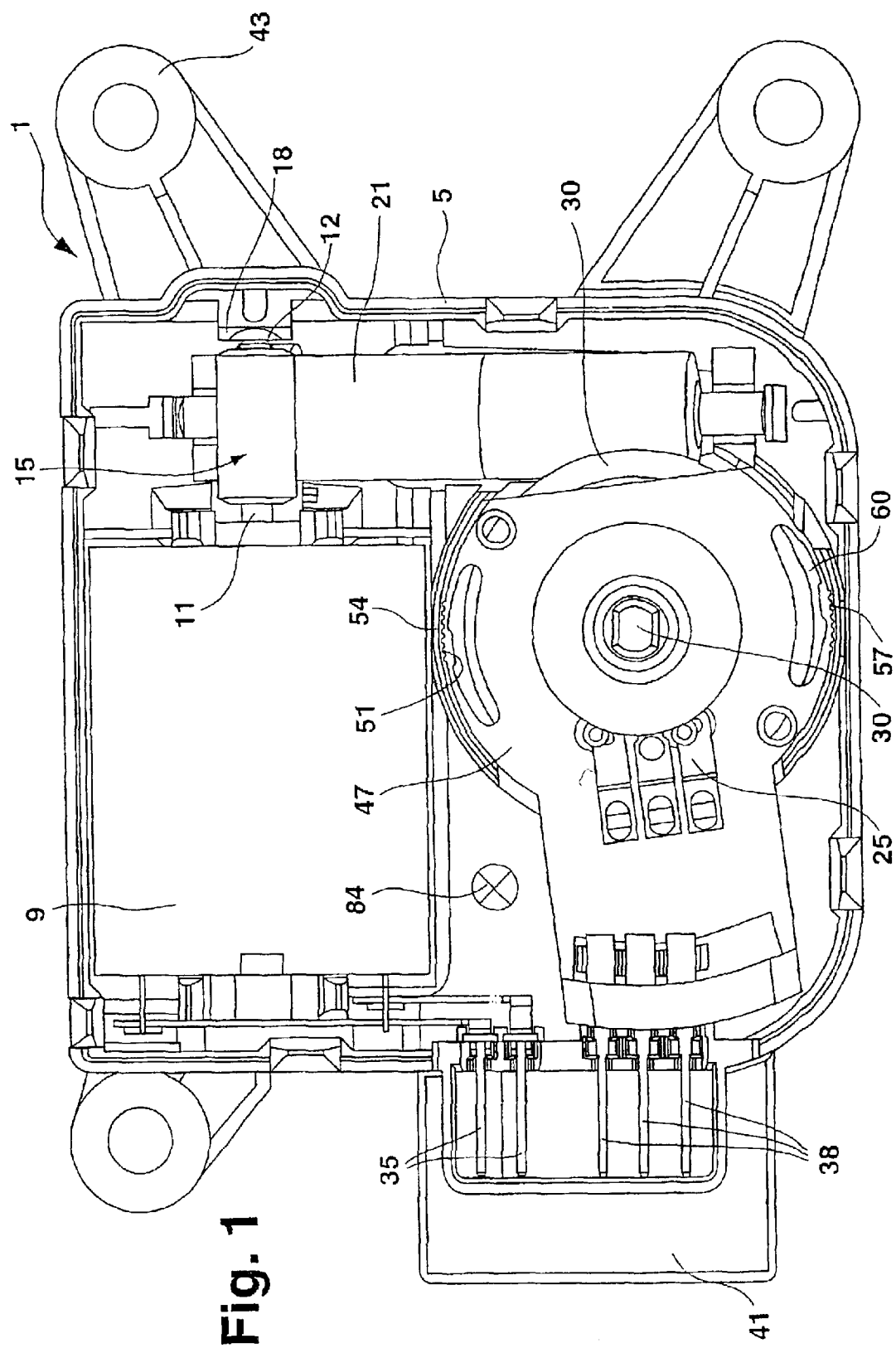
FIG. 1 shows a control drive designed according to the invention.

FIG. 1 shows a control drive 1 that comprises a housing 5 and an electric motor 9 that has a rotor shaft 11, on the end 12 of which a worm gear 15 is located.

The axial play of the rotor shaft 11 is damped by a leaf spring 18 that is integral with the housing 5, for example. The worm gear 15 is coupled to a transverse worm 21. The transverse worm 21 is clamped into the housing 5, for example. The transverse worm 21 is connected directly to a potentiometer 25.

When a rotor shaft 11 rotates, this brings about a rotation of the driven wheel 30 around an axis that projects at a right angle out of the plane of the drawing. This rotation of the driven wheel 30 and, therefore, the potentiometer 25, can be tapped via an electrically conducting potentiometer connection 38. The electric motor 9 also has electric motor connections 35 that are located together with the potentiometer connections 38, for example, in a connector shell 41. The housing 5 can be secured to another component using fastening elements 43. The potentiometer connections 38 are clamped into the housing 5 in the vicinity of the connector shell 41.

The potentiometer 25 is located in a potentiometer housing 47. The potentiometer 25 basically comprises an electrically conducting loop (not shown) and an electrical pickup (not shown), e.g., a wiper. The loop is, e.g., embedded in the potentiometer housing 47. The position of the pickup in relation to the loop is changed by turning either the driven wheel 30 or the potentiometer housing 47.

The potentiometer housing 47 comprises at least one detent tooth 51 on its circumference, and the housing 5 has at least one detent projection 54, for example. When the potentiometer housing 47 is installed in the housing 5, the at least one detent tooth 51 and the at least detent projection 54 form a detent toothing 57.

After the potentiometer 25 is installed in the potentiometer housing 47, a certain home position of the pickup in relation to the loop of the potentiometer 25 should exist. This can be a position at the beginning or the end of the loop, or an intermediate position. The position of the driven wheel 30 is thereby specified by an external adjusting lever and, therefore, the position of the pickup of the potentiometer 25. To reach the home position, therefore, the motor 9 cannot be rotated in such a fashion that a home position is reached, because this would cause the driven wheel 30 to rotate. The potentiometer 47 must therefore be rotated—while overcoming the detent toothing 57—using the loop around an axis extending at a right angle out of the plane of the drawing until a predetermined home position is reached, because this does not cause the driven wheel 30 to rotate. Production-induced tolerances of the potentiometer 25 can therefore be offset.

For this reason, the potentiometer housing 47 comprises at least one longitudinal hole 60 in the vicinity of the at least one detent tooth 51, for example, that shapes the wall comprising the at least one detent tooth 51 of the potentiometer housing 47 in an at least partially elastic design and makes it possible for the potentiometer housing 47 to rotate—when the detent toothing 57 is overcome—by means of manual force, for example. The potentiometer housing 47 is sufficiently secured against rotation by means of the detent toothing 57 when the mechanical stresses occur to which the potentiometer housing is subjected in a motor vehicle, for example.

After the electric motor 9, the transverse worm 21, the driven wheel 30, and the potentiometer 25 with the potentiometer housing 47 are installed in the housing 5 in a direction of installation 84, an electrical pickup at the potentiometer connections is used to determine whether the potentiometer 25 is located in the home position. If this is not the case, the potentiometer housing 47 is rotated against the resistance of the detent toothing 57 around a positive or negative angle. This causes the potentiometer 25 to rotate immediately until the potentiometer 25 is located in a predetermined home position, i.e., null balance is present.

Figure 2:
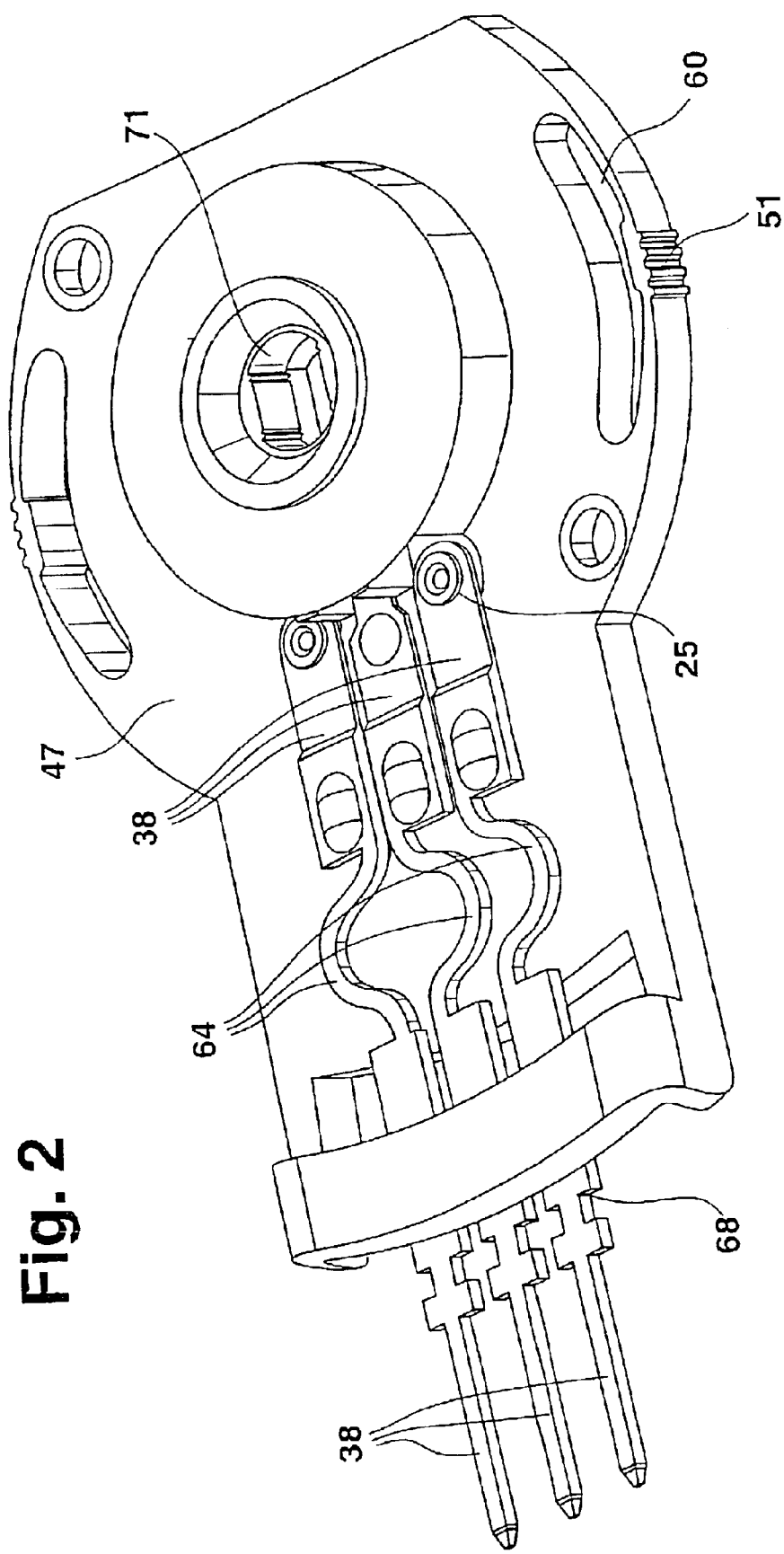
FIG. 2 shows a potentiometer with potentiometer housing.

FIG. 2 shows the potentiometer housing 47 with the potentiometer 25.

The potentiometer connections 38 are designed in the shapes of waves, i.e., they have a serpentine contour 64 that ensure that length will be offset as necessary when the potentiometer housing 47 is rotated, because the serpentine contour 64 makes it very easy to extend or contract the potentiometer connections 38. The potentiometer connections 38 comprise an indentation 68, for example, that allows the potentiometer connections 38 to be clamped into the housing 5 and ensures that the ends of the potentiometer connections 38 have a fixed position in the plug connection 41.

The potentiometer housing 47 has a contoured hole 71 into which the driven wheel 30 grips, e.g., using a pivot with cheeks. The design of the potentiometer 25 is made known to one skilled in the art in U.S. Pat. No. 5,794,765, for example, and should be part of the disclosure.

Figure 3:
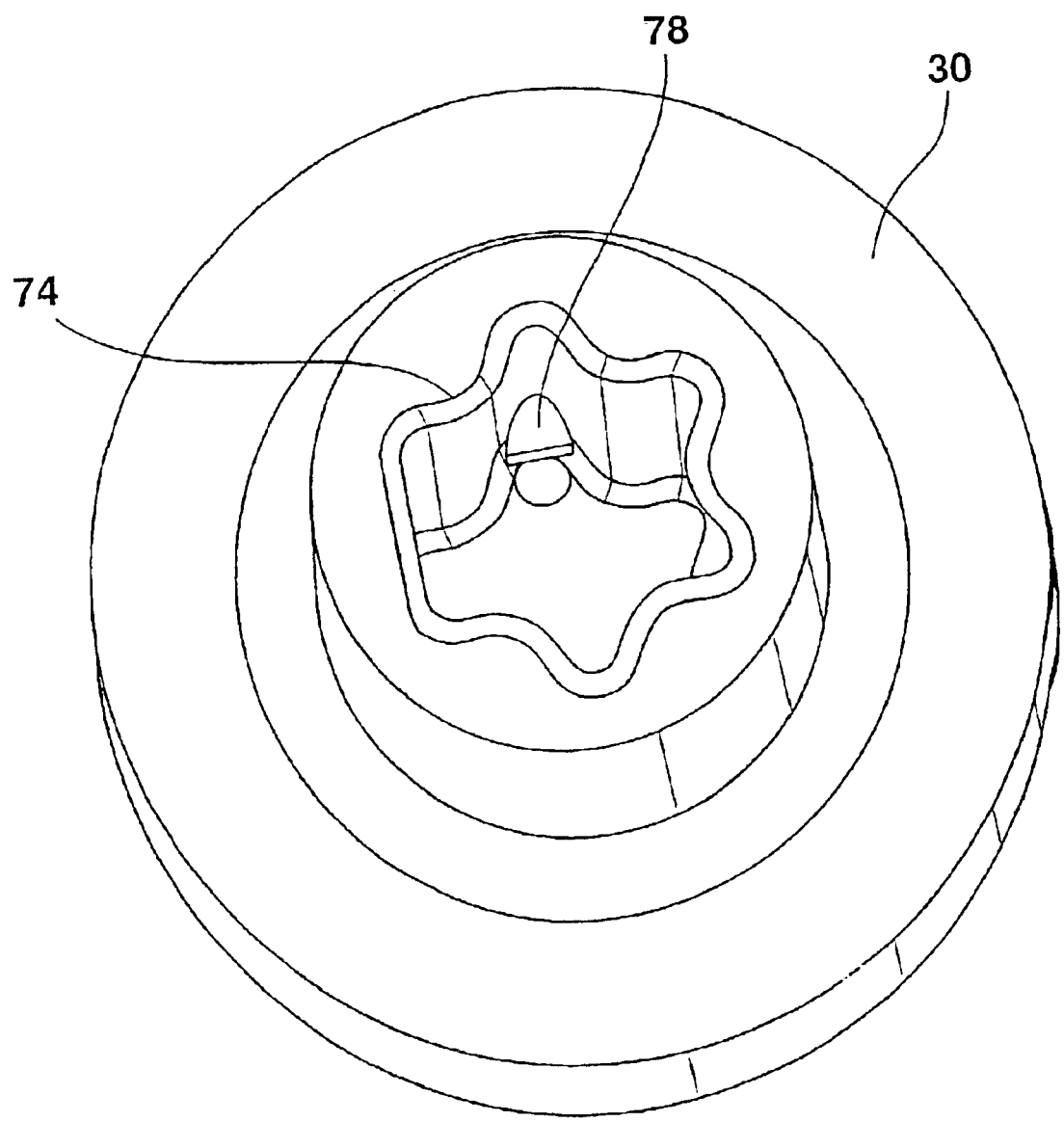
FIG. 3 shows a driven wheel.

FIG. 3 shows a driven wheel 30. The driven wheel 30 comprises a contoured hole in the center that has a torx shape, for example. This allows an adjusting lever provided with a congruently designed shoulder to be fixed radially and matched to an unequivocal position. An undercut 78 is further provided in the contoured hole 74, for example, that serves to catch the shoulder of the adjusting lever, i.e., the undercut 78 forms an axial fixation.

What is claimed is:

1. A control drive comprising:
    a housing (5);
    a driven wheel (30);
    an electric motor (9) disposed in the housing and coupled with the driven wheel (30); and
    a potentiometer (25) arranged in the housing (5) for determination of a position of the driven wheel (30), wherein the potentiometer (25) is located in a potentiometer housing (47), where the potentiometer housing (47) has at least one detent tooth (51), wherein the housing (5) has at least one detent projection (54), wherein the at least one detent projection (54) of the housing (5) in which the potentiometer housing (47) is installed forms a detent toothing (57) with the at least one detent tooth (51), wherein the detent toothing (57) or the detent tooth (51) is flexible enough to allow relative rotation of the potentiometer housing (47) within the housing (5).

2. The control drive according to claim 1, wherein the at least one detent tooth is disposed on a circumference of the potentiometer housing (47).

3. The control drive according to claim 1, wherein the potentiometer housing (47) is located on the housing (5).

4. The control drive according to claim 1, wherein at least one longitudinal hole (60) is located in the potentiometer housing (47) in the vicinity of the at least one detent tooth (51).

5. The control drive according to claim 1, wherein the control drive (1) has electrical connections, wherein some of the electrical connections comprise electrical potentiometer connections, and wherein the potentiometer connections (38) are designed at least partially similar to a serpentine contour (64).

6. The control drive according to claim 1, wherein the electric motor (9) has a rotor shaft (11), wherein a worm gear (15) is disposed on one end (12) of the rotor shaft (11), wherein the worm gear (15) is coupled to a transverse worm (21) in the housing (5), and wherein the transverse worm (21) meshes with the driven wheel (30).

7. The control drive according to claim 6, wherein the axial play of the rotor shaft (11) is damped via a leaf spring (18).

8. The control drive according to claim 1, wherein all parts to be installed in the housing (5) are installable in the housing (5) in one direction of installation (84).

9. The control drive according to claim 6, wherein at least one element selected from the group consisting of the transverse worm (21) and the electric motor (9) is insertable in the housing (5).

10. A control drive comprising:
    a housing (5);
    a driven wheel (30);
    an electric motor (9) disposed in the housing and coupled with the driven wheel (30); and
    a potentiometer (25) arranged in the housing (5) for determination of a position of the driven wheel (30), wherein the potentiometer (25) is located in a potentiometer housing (47), wherein the potentiometer housing (47) has at least one detent tooth (51) arranged directly on and formed of one piece therewith, wherein the housing (5) has at least one detent projection (54) arranged directly on and formed of one-piece therewith, and wherein the at least one detent projection (54) of the housing (5) in which the potentiometer housing (47) is installed forms a detent toothing (57) with the at least one detent tooth (51).

11. A control drive comprising:
    a housing (5);
    a driven wheel (30);
    an electric motor (9) disposed in the housing and coupled with the driven wheel (30); and
    a potentiometer (25) for determination of a position of the driven wheel (30), wherein the potentiometer (25) is located in a potentiometer housing (47), wherein the potentiometer housing (47) has at least one detent tooth (51), wherein the housing (5) has at least one detent projection (54), and wherein the at least one detent projection (54) forms a detent toothing (57) with the at least one detent tooth (51), wherein the potentiometer housing (47) is rotatable relative to the housing (5) when the detent projection (54) and the detent tooth (51) form a detent toothing (57).

* * * * *